United States Patent [19]

Tumminia

[11] 4,396,449
[45] Aug. 2, 1983

[54] CUTTING AND SEALING PROCESS FOR THERMOPLASTIC MATERIALS

[75] Inventor: Dennis R. Tumminia, Midland, Mich.

[73] Assignee: The Dow Chemical Company, Midland, Mich.

[21] Appl. No.: 310,935

[22] Filed: Oct. 13, 1981

[51] Int. Cl.³ .............................................. B32B 31/18
[52] U.S. Cl. .................................... 156/251; 156/515
[58] Field of Search ................ 156/250, 251, 510, 515

[56] References Cited

U.S. PATENT DOCUMENTS 3,574,039  4/1971  Fehr et al. ............................ 156/251
4,319,952  5/1982  Schjeldahl ............................ 156/515

FOREIGN PATENT DOCUMENTS 788969  7/1968  Canada ................................ 156/515

Primary Examiner—Caleb Weston
Attorney, Agent, or Firm—L. E. Hessenaur, Jr.

[57] ABSTRACT

A method for reducing wax build-up on a sealing equipment where a heated element, such as a hot wire, cuts through and seals adjacent layers of thermoplastic material containing thickened thermoplastic sections. The wax build-up is related to the contact between the cutting and sealing wire and the thermoplastic material. The improvement results from a proper shaping of the cutting and sealing wire, by regulating the rising height and profiling of the wire through the film and thickened sections, and by employing relatively high wire travel speeds whereby it is possible to take advantage of the shrink back characteristics resulting from the orientation already built into the thermoplastic material, so that minimum contact between the wire and the thermoplastic material is realized.

11 Claims, 14 Drawing Figures

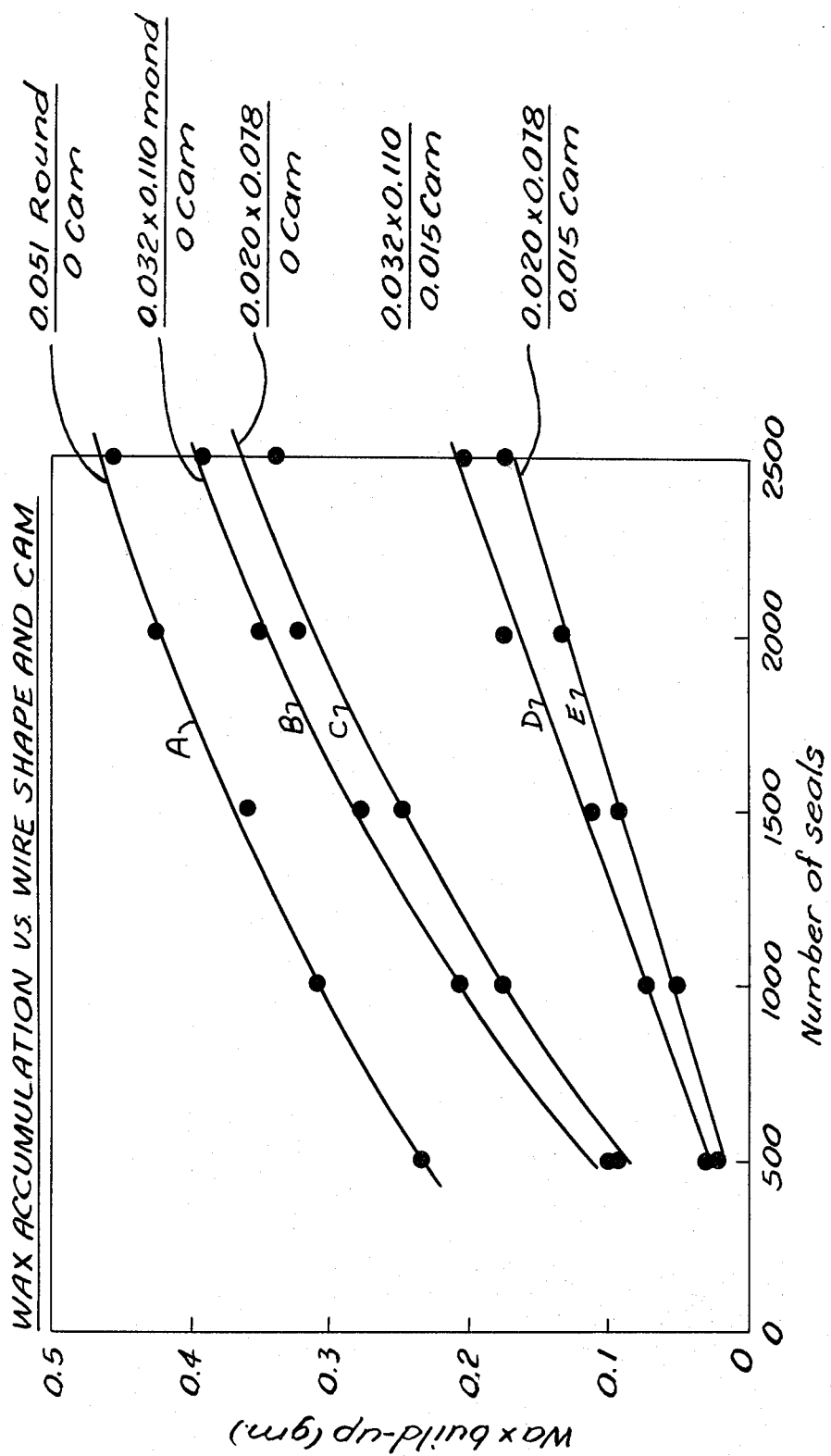

CUTTING AND SEALING PROCESS FOR THERMOPLASTIC MATERIALS

BACKGROUND OF THE INVENTION

In the process of manufacturing thermoplastic bags or other containers including a thickened closure or other section comprised of a thermoplastic material, it is required to take strips of the material and seal peripheral portions thereof to form the enclosure comprising the bag. At the time the side seals of the bag are formed, the material is commonly cut from a web of material by the same element which does the sealing.

The "cutter/sealer" element is normally a metallic alloy wire which prior to this invention had customarily been of a circular cross section. To cut through and seal both the main body and thickened sections of the thermoplastic material, such as a polyethylene resin, the wire would be heated to about 400° Fahrenheit above the degradation temperature of the thermoplastic material. Degradated polymer which is created by contact of the material with the hot wire can create a wax on the sealing equipment reducing its efficiency and requiring frequent shutdown for cleaning. It can also contaminate the product. Production lines customarily have been shut down 10% of the time just for removal of wax build-up on the sealing equipment.

A circular cross-sectioned wire has been employed in the past because it is generally available and because it is the best cross section for avoiding twisting, sagging and vibratory action, the latter sometimes resulting in shorting between the wire and the rest of the sealing equipment. It also provides a more uniform heat gradient throughout the cross section. However, because of its rounded profile, the circular cross section does not melt and pierce as well as a wire which would have a sharper edge approaching the film to be cut and sealed, resulting in an excessive wax build-up. It has been found that changing the shape of the wire can provide the opportunity to significantly reduce the wax build-up.

SUMMARY OF THE INVENTION

This invention involves a high-speed process for cutting and sealing portions of thermoplastic materials, such as films, for forming bags or other containers which include a thickened section such as found in bags with integral thermoplastic closures, as for example, taught in U.S. Pat. No. Re. 28,969. The invention specifically relates to such a high-speed process whereby an improved cutting and sealing operation minimizes the build-up of wax on the sealing components without unduly sacrificing the sealability of the products being manufactured. The improved process results from the employment of a hot metallic alloy cutting and sealing element, preferably in the form of a wire of a generally flat shape having a ratio of height to width of from about 5 to 1 to about 2 to 1 and preferably from about 3 to 1. The wire is suspended below the film to be cut with a rise, during cutting, of its engaging edge formed at one of its width ends higher at the thicker sections of the film, such as found at a closure section, from that at a remote section of the film in a ratio from about 2 to 1, such height rise being about 25 mils to about 50 mils in a typical process. The wire passes through the film quickly so as to minimize contact between the film and the hot wire. In operation with a film oriented at least in the machine direction, such a shaped wire passing with such a height rise through the film at a high speed will cause the oriented film to pull quickly back from the wire so that the contact between the wire and the film is minimized to a point limited by the necessary sealing of the thermoplastic plies forming the product. The narrow edge of the wire can be pointed should desired results necessitate a higher shearing factor. By use of the concepts of the present invention a substantial reduction in wax build-up which would otherwise occur is made possible.

BRIEF DESCRIPTION OF THE DRAWINGS

FIG. 7 is a graphical representation of the effect of wire shape and speed on wax accumulation.

DETAILED DESCRIPTION OF THE INVENTION

Figure 1:
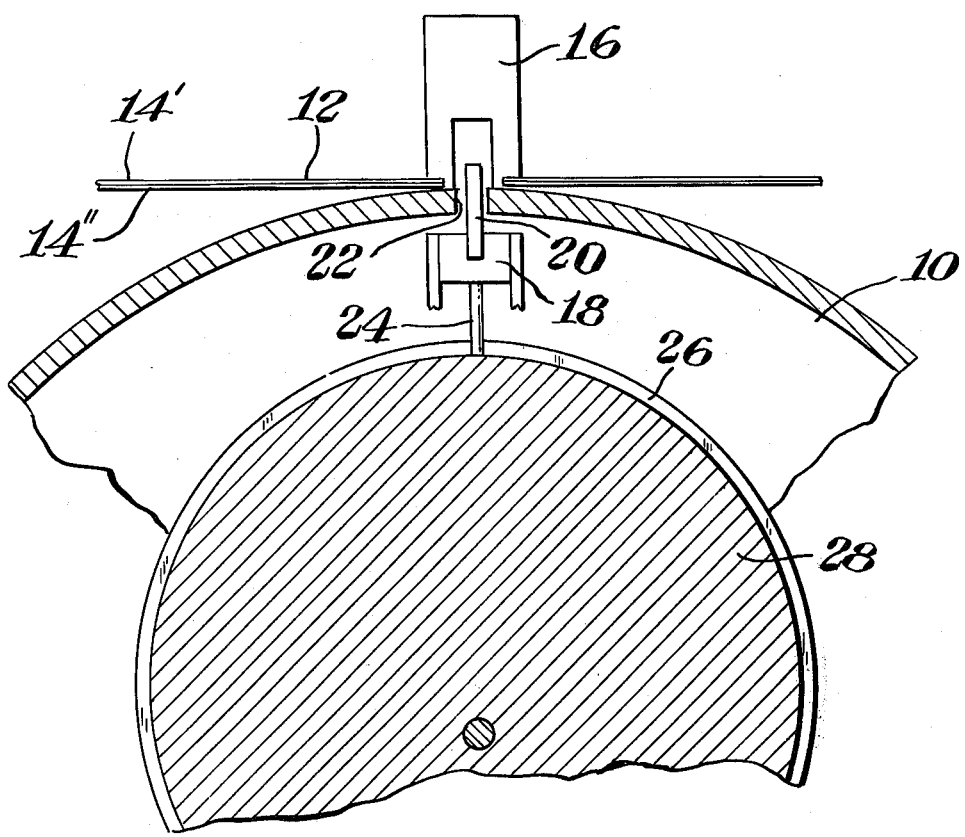
FIG. 1 is a schematic side view of cutting and sealing apparatus which can incorporate the process of the present invention.
Figure 2:
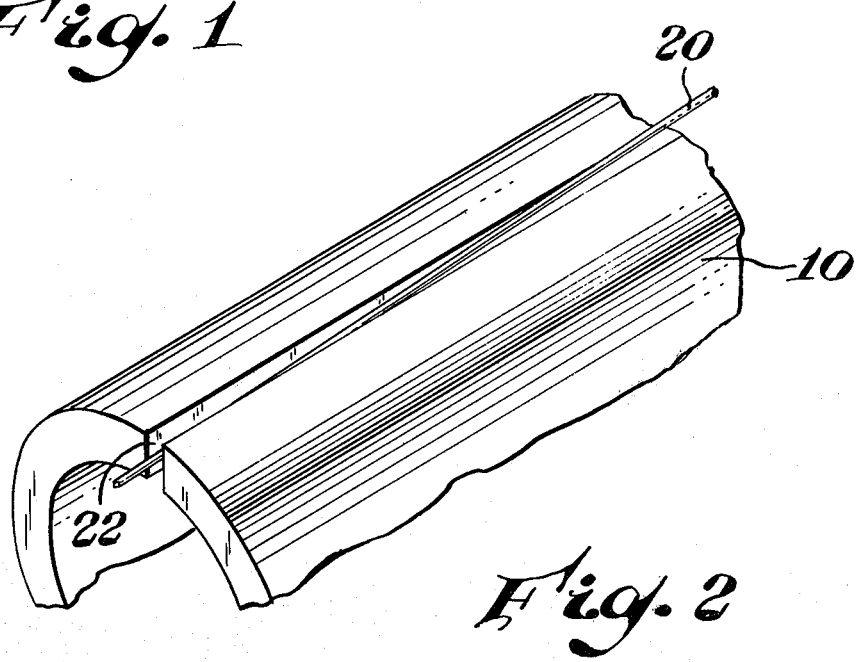
FIG. 2 is an isometric looking at one end of the apparatus of FIG. 1.

Referring to the general configuration of the cutting and sealing apparatus of FIG. 1 useful for making bags or other containers, there is shown a drum 10 which takes a supply of thermoplastic film or material 12, comprising plies 14' and 14'', which is secured to the drum by a clamp 16 directly over a movable mechanism 18 which carries a cutting/sealing element 20. Several such clamp 16, mechanism 18 combinations can be located about the drum 10 as desired. Mechanism 18 slides inwardly and outwardly within drum cavity 22 as determined by the connector 24 as it rides along groove 26 formed about the peripheral edge of eccentric cam 28, the mechanism being shown in its outermost position. After being cut and sealed by mechanism 18 the film is thereafter cooled on the drum 10 and taken off as bags in a stock and boxed (not shown). The details of how the cutter/sealer element or wire 20 operates within cavity 22 of drum 10 is shown more clearly in FIG. 2. It can be seen that the wire 20 is carried adjacent the ends of the drum and is supported so that its end 30 is supported lower in cavity 22 than its portion 32 adjacent the thicker section of the film. Wire 20 is heated through its end connector 24 by conventional means not shown.

Figure 3:
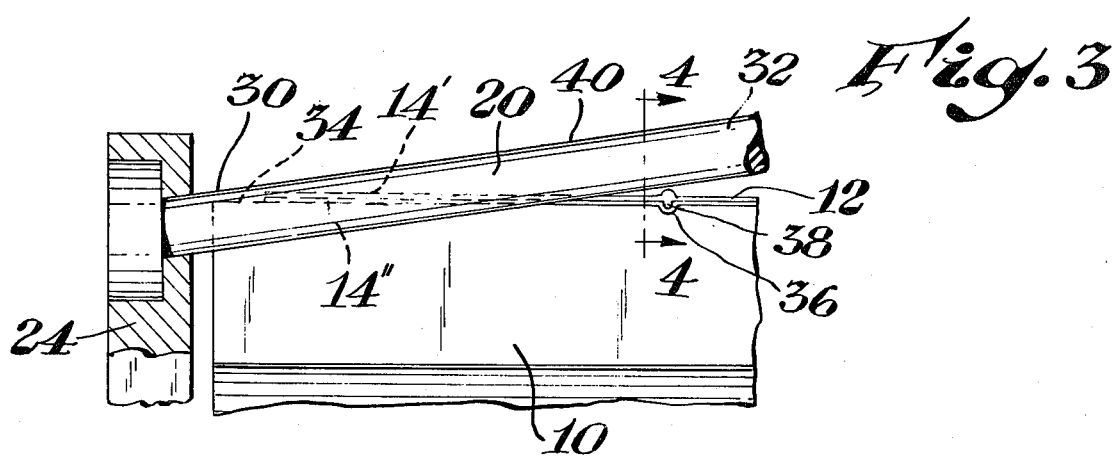
FIG. 3 is a greatly enlarged showing of the mechanism designed to practice the process of the present invention, being a partial section of the mechanism shown in FIG. 2.

More detail is found in FIG. 3. Here a drum surface 34 contains a groove 36 for carrying a thickened thermoplastic section or protrusion such as a zipper closure profile 38 of the lower engaging thermoplastic film ply 14'' of material 12 which has been cut and sealed into container segments. Shown above the thermoplastic film 12 is the hot wire 20 which is shown in its position after it has passed through the thermoplastic film plies 14' and 14''. The rise of wire 20 across drum 10 is higher in the portion 32 than it is at its end 30 in a way as illustrated.

In actual practice, edge 40, which is the top of wire 20 and the initial film engaging part thereof, is illustrated at about the uppermost preferred limit for wire travel. This limit is reached where the end 30 has just slightly passed through film 12. In one specific embodiment of the invention, the rise of edge 40 was about 50 or 60 mils above drum surface 34 at the portion 32 and about 20 or 25 mils at end position 30 as shown in FIG. 3. The fact that the wire is forced down by the thickened section of the thermoplastic material is the reason that the suspension of the wire should be higher near the zipper closure 38. Also, in a high-speed process if the wire rises too high after it passes the material, there may a tendency as the thermoplastic film relaxes to be frictionally engaged by the wire and pulled and degradated by the heat of the wire. This can be avoided by stopping the wire at a desired height after it has passed through thermoplastic film plies.

Figures 4, 5A, 5B:
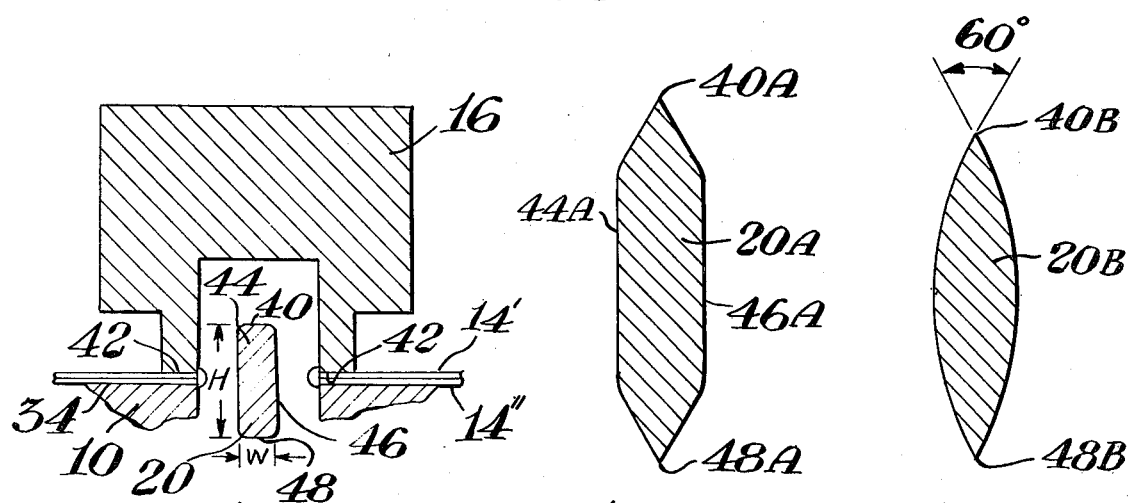
FIG. 4 is a cross-sectional view taken along the reference line 4—4 of FIG. 3, adding the clamp of FIG. 1, showing a preferred embodiment of the cutter/sealer element of this invention.
FIGS. 5A, 5B, 5C, 5D and 5E show in cross section other possible variations of the cutter/sealer element of the present invention.
Figures 5C, 5D, 5E:
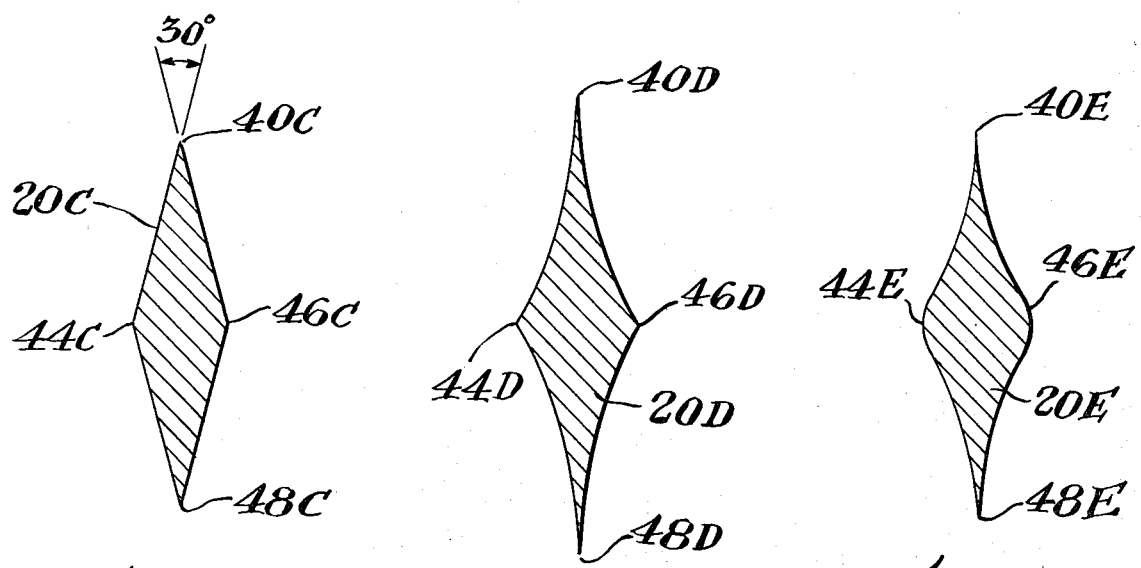

FIG. 4 shows a detailed schematic taken along the line 4—4 of FIG. 3, only adding clamp 16, showing the wire 20 as it has passed through the film plies 14' and 14'' which are clamped by jaws 42 of clamp 16 on each side thereof, the wire 20 being in the position shown in FIG. 3.

The sealing and cutting wire 20 illustrated in FIG. 4 is a preferred embodiment. It is essentially rectangular in shape with flat sides 44 and 46 and rounded ends 40 and 48. The height (shown as "H") to width (shown as "W") dimension ratio can vary from 5 to 1 to 2 to 1 and accomplish the purposes of the present invention. However, the best results appear to occur when the ratio is closer to about 3 to 1.

For example, good results have been obtained when the height was 80 mils and the width 25 mils. In other cases, depending upon the materials and thicknesses involved, particularly that of the profile through which the hot wire must pass, a height of 60 mils and a width of 25 mils has performed very well as has a height to width ratio of 80 mils to 30 mils. Having rounded ends 40 and 48 has not appeared to minimize significantly the effectiveness of the flat wire in cutting and sealing the thermoplastic film plies 14' and 14''.

Other sealing and cutting wire cross sections, such as shown in FIGS. 5A through 5E, illustrate various configurations which can maintain height to width ratios contemplated by this invention and, it is believed, will function in a manner within the scope of this invention even though the elongated cross section can vary in its particular shape from that shown in the preferred embodiment of wire 20 of FIG. 4, whether the sealing or cutting element be called a wire, knife, protrusion, element or whatever.

Instead of rounded ends 40 and 48 and as for wire 20, the ends 40A and 48A of section A of FIG. 5A are more pointed. This may be helpful if sharpness in a particular situation where unusually tough thermoplastic materials which do not soften as readily may be incurred. Sides 44A and 46A are still essentially flat and parallel. Typical other cross sections of the cutting and sealing wire can be that shown in FIG. 5B where the cross section of wire 20B is generally lens-shaped with pointed ends 40B and 48B, or in FIG. 5C where the cross section of the wire 20C is generally diamond-shaped with pointed ends 40C and 48C and pointed sides 44C and 46C or in FIG. 5D wherein the cross-sectional configuration 20D is more star-shaped or modified diamond-shaped with similarly pointed ends 40D and 48D and sides 44D and 46D or in FIG. 5E where the cross-sectional configuration of the wire 20E has more bulbular shaped sides 44E and 46E with pointed ends 40E and 48E. These various cross sections are merely intended to show possibilities and are not exhaustive of all the cross-sectional configurations which can possibly be operable within the concepts of the present invention to achieve the purposes thereof but are all of an elongated configuration as contemplated within this invention. In each case, the ends may be rounded or pointed as meets the needs of a particular application.

The type of materials for which this application is particularly directed are thermoplastic materials such as olefinic polymers or copolymers, polyesters, nylon, vinylidene chloride or vinyl chloride polymers and copolymers, hydrolized ethylene vinyl alcohol, etc.

Figure 6A:
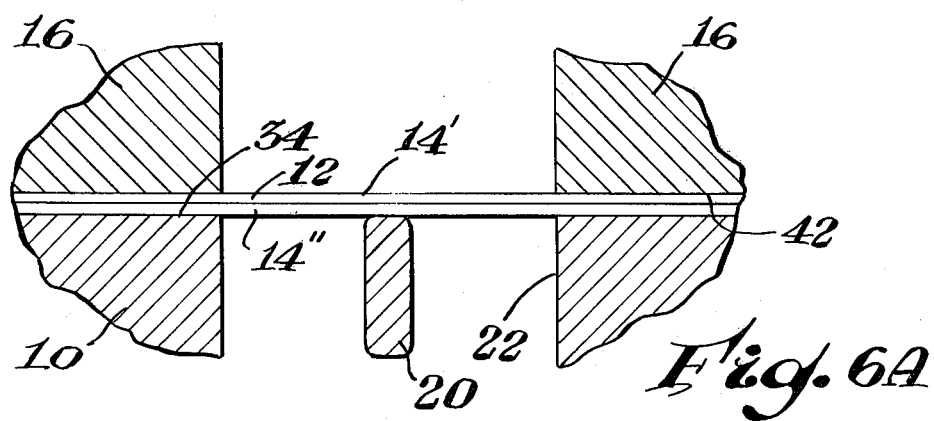
FIGS. 6A, 6B, 6C and 6D illustrate the sequence of events as the cutter/sealer element passes through the plies of thermoplastic film, as the film shrinks away from the cutter/sealer element.
Figure 6B:
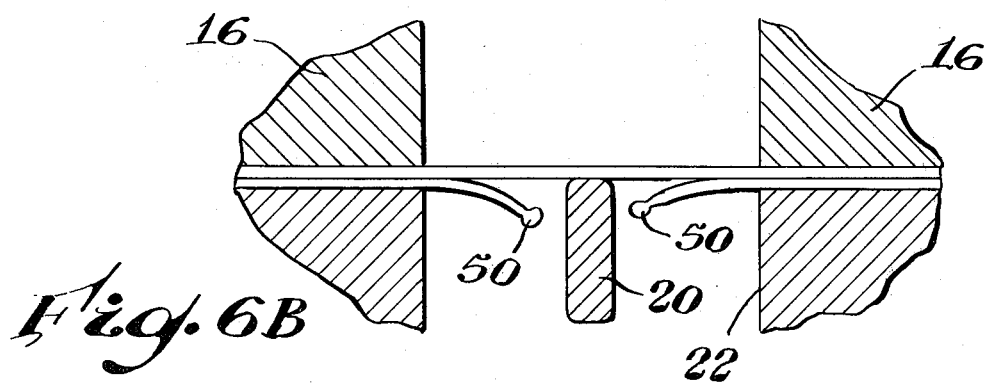
Figure 6C:
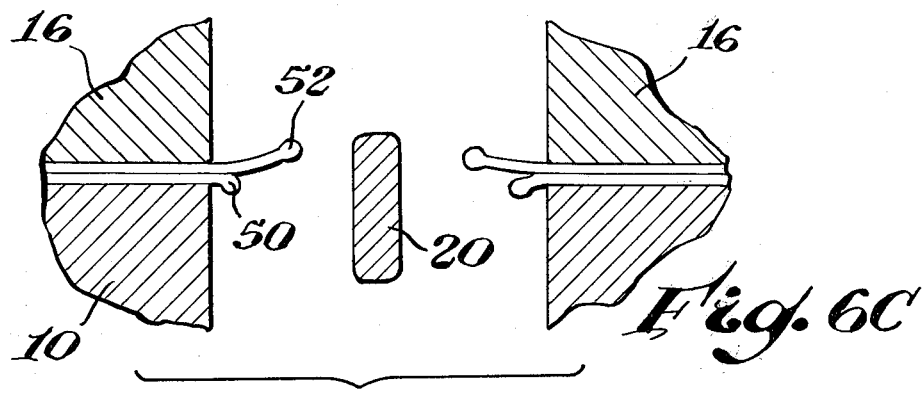
Figure 6D:
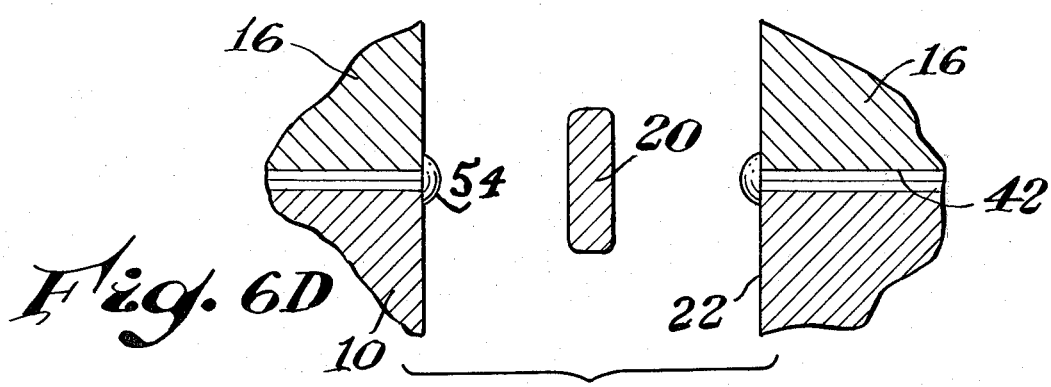

The speed with which the cutting and sealing wire 20 cuts through the film plies 14' and 14'' is illustrated in the sequence of figures shown in FIGS. 6A through 6D. Here wire 20 in FIG. 6A is shown just as it approaches the two film plies 14' and 14''. FIG. 6B shows the wire 20 as it has severed the first ply 14' and before it has severed the second ply 14'' leaving melting end 50. The machine direction orientation built into the film by its stretching during its manufacture is customarily great enough that upon contact by the wire 20 the first ply 14' has shrunk away significantly from the cutting and sealing element 20 so that there is essentially no contact between the two before the wire severs the second ply 14''. FIG. 6C illustrates the condition of the plies 14' and 14'' just as the wire 20 has severed film ply 14' having melting end 52, the film melted end 50 adjacent ply 14'', being at that point already essentially shrunk back to the clamping jaws 42 holding the film plies together as they are cut and sealed. FIG. 6D shows the wire 20 at its stop position above the jaws 42 with the two film plies 14' and 14'' forming film 12 being shrunk back to the clamping jaws 42 and drum cavity 22 and forming beaded seal 38 comprised of melting ends 50 and 52. This beaded seal is what forms the edge of the bag being produced.

It became apparent in the performing of the processes of this invention that the wax build-up and the total film weight loss both decreased with decreasing effective cross-sectional area of the heated cutting and sealing element or wire 20 which would be true whether the sealing element is called a wire, knife, protrusion or other element, as earlier mentioned.

FIG. 7 illustrates graphically the effect on wire shape and speed of film penetration on wax accumulation. In FIG. 7 run A shows a high-speed run with a round cross-sectioned cutting and sealing element. Run B shows a similar run using a cutting and sealing of a diamond cross section, somewhat like that typified as 24C, and run C shows the results employing a flat cross-sectioned cutting and sealing element, somewhat like that typified as 20 herein, according to a preferred embodiment of the present invention. As can be seen, with the speed the same for all three runs, the wax build-up on the jaws and sealing equipment generally was the least with the flat cross-sectioned shape. The wax also gets on the final film product and gives off an undesirable odor. The seals were comparably good on all three runs. To further find what the effect of the wire shape and speed would be on wax accumulation, the two runs B and C were repeated only with a slightly slower cam speed. It was found in both instances as shown in run B and run E, the wax build-up was even less with a somewhat slower speed but it was found that the seals were not as good as with the higher speed. The seal quality, as illustrated in the following Table A, shows that with the faster speed, that is, with the 0 cam offset, 100% good seals were obtained with each of the differently cross-sectioned hot sealing wires. Significantly, few good seals were obtained with the slower speeds.

TABLE A

CAM (WIRE SPEED) VS. SEAL QUALITY

| WIRE | CAM OFFSET | % GOOD SEALS |
| --- | --- | --- |
| 0.051 Round | 0 (fast) | 100 |
|  | 0.090 (very slow) | 12 |
| 0.020 × 0.078 | 0 (fast) | 100 |
| Flat | 0.015 (slow) | 100 |
|  | 0.045 (slower) | 0 |
| 0.032 × 0.110 | 0 (fast) | 100 |
| Diamond | 0.015 (slow) | 88 |
| 0.034 × 0.070 | 0 (fast) | 100 |
| Flat | 0.090 (very slow) | 16 |

The effect of the wire position versus wax build-up and film weight loss is typified by the examples in following Table B. From this table it is apparent that the film weight loss in every instance and the wax build-up in at least one instance is less if the rise of the wire after it cuts the film is not too high.

TABLE B

WIRE POSITION VS. WAX BUILD-UP, FILM WEIGHT LOSS

| WIRE | POSITION* | WAX BUILD-UP (gms) | FILM WEIGHT LOSS (gms) |
| --- | --- | --- | --- |
| 0.032 × 0.110 | A | 0.055 | 0.25 |
| Diamond | B | 0.045 | 0.16 |
| 0.034 × 0.070 | A | 0.03 | 0.62 |
| Flat | B | 0.03 | 0.43 |
| 0.022 × 0.070 | A | 0 | 0.31 |
| Diamond | B | 0 | 0.10 |

*A The top of the wire is 0.051" above the drum tangent at the zipper closure and 0.025" at the bottom of the bag.
B The dimensions (as in "A") are 0.040" and 0.020", respectively.

The wires in every case were equipped with a conventional moderate current source for heating and were made of such heat conductive metals as Inconel 625 metal alloy, Inconel X750 metal alloy, Chromel C and Chromel A metal alloys. Other well-known metallic alloys might also be used. Whichever alloy is chosen for manufacture of the cutting and sealing element 20, the relative relationships and the benefits of practicing the steps of the present invention would be expected to be comparable in relation to one another in the same material.

In summarizing the results obtainable by the present invention, it has been discovered that a cutting and sealing element having a cross-sectional arrangement previously described as being within the concepts of this invention decreases both the film weight loss and the wax build-up on sealing surfaces while readily making acceptable seals within a normal cycle time. This has been made possible in the cutting and sealing of piles of oriented thermoplastic films having thickened sections by employing the steps of (1) using an elongated relatively flat cutting and sealing element having a height to width ratio of from about 5:1 to 2:1, preferably about 3:1, (2) biasing the element along its length so that the cutting edge piercing the film travels through the film only a short distance at the thinner sections thereof and a longer distance at the thicker sections thereof; (3) passing the element through said film plies at a relatively high speed, whereby the orientation in the film plies is relaxed rapidly so that shrinkage of the film from the element speedily occurs with the result that contact between the film plies and the element is minimized. The free shrinkage of the film containing the enlarged profile or thickened section of the film in the preferred operation of the invention was roughly 80% in the machine direction, with a slight growth, about 30%, realized in the transverse direction. The latter could be a shrinkage also if the film were more oriented in the transverse direction. There was little question that as a result of the practice of this invention reducing the amount of plastic that the hot cutting and sealing element contacts reduces the film weight loss and the wax build-up. Thus, a high shrinkage in the film aids in reducing the contact as well as does the high speed of passing, the height rise of the element after it has passed through the film, and the configuration of the cutting and sealing element itself. However, it was not found that using an extremely sharp leading edge for the cutting and sealing element would necessarily permit the plastic to retract ahead of the cutting and sealing element faster than would a somewhat more rounded leading edge.

It has been known that large amounts of wax will be generated due to fragments of the polymer which stick to the cutting and sealing element if it is not hot enough. However once an adequate temperature range is passed, it has been found that additional increases in temperature do not result in significant further reductions in the amount of wax generated or collected.

Reducing the speed by which the cutting and sealing element approaches the film should reduce the amount of wax generated by allowing the plastic to melt away from the path of wire. However, a second fact was observed that was not expected. At slow wire speeds the film orientation of an oriented film relaxes prior to the film separation. The relaxation reduces a strong positive sealing parameter and the resultant welds made at slow speeds had poor seal quality. A slower speed may allow more plastic to move out of the path of the wire and thus reduce the amount of the material that contacts the wire but seal quality may be sacrificed.

Some limit on how tall and narrow the cutting and sealing wire configuration can take may be dependent on the warpage problem. Generally the wires used for this work had good hot strength. Some wire warpage was observed at the 5:1 aspect ratio but not enough to prevent adequate testing. The preferred wire shape has an aspect ratio for height to width of about 3:1. Again, orientation appears to play a critical role in the sealing process. Normally the cutting and sealing wire contacts and melts the film quickly. The film rapidly separates and shrinks back to the clamping jaws. By slowing the wire slightly the film is heated prior to contact with the cutting and sealing element and much of the orientation is lost. When the wire does finally contact the film, the film stretches in a rubbery fashion, melts through and slowly moves toward the clamping bar. The resulting weld is quite irregular and may have a high tendency to leak.

It is clear that the shape of a cutting and sealing element, the speed at which the element approaches the film, the orientation available in the film and the height and profiling of the cutting and sealing element to the film and any enlarged profiles contained thereon are all factors determining the amount of wax build-up, film weight loss and the quality of the seal which results. A proper balancing and control of these repective elements in the process will achieve the optimum or near optimum balance between wax build-up and seal quality.

While certain representative embodiments and details have been shown for purposes of illustrating the invention, it will be apparent to those skilled in the art that various changes and modifications can be made therein without departing from the spirit and scope of the invention. For example, more than two plies of film could be cut and sealed according to the present invention.

What is claimed is:

1. A process for cutting multiple plies of oriented thermoplastic material having thickened sections and simultaneously sealing severed margins thereof comprising the steps of:
   (a) clamping the material adjacent the area thereof to be cut and sealed;
   (b) selecting a cutting and sealing element with an elongated cross-section having a height to width ratio from about 5:1 to 2:1, capable of being heated and for a length at least as long as the section to be cut and sealed;
   (c) heating said element to a temperature sufficient to cut and seal said material;
   (d) biasing the travel of said element so that an engaging edge thereof passes through the thickened section for a distance no less than that through the rest of said material and without the entire element passing beyond the last ply to be engaged by the element but sufficient to sever all such plies; and
   (e) permitting the severed plies of material to retract a given distance and form a sealed edge.

2. The process of claim 1 wherein said element at its width defining a heated cutting edge for engaging the thermoplastic material to sever the same.

3. The process of claim 2 wherein said cutting edge is generally rounded.

4. The process of claim 2 wherein said cutting edge is generally pointed.

5. The process of claim 2 wherein the height to width ratio of said element is about 3:1.

6. The process of claim 1 wherein said element is outwardly biased adjacent said thickened sections so that after said material is severed, the element adjacent the thickened sections is further from the film plies than is otherwise generally the case.

7. The process of claim 6 wherein the outwardly biased part of the element is biased at least twice the distance at another less thick section of the material.

8. The process of claim 7 wherein the heat discharged from said element and the speed at which the element engages the film plies is selected such that a first severed ply shrinks from contact with said element prior to said elements severing of the next adjacent ply.

9. The method of claim 8 wherein all plies are of the same material composition.

10. In an apparatus for cutting multiple plies of oriented thermoplastic material having thickened sections and simultaneously sealing severed margins thereof,
    (a) a material supporting surface containing at least one cavity;
    (b) means for clamping said material across said cavity;
    (c) an elongated cutting and sealing element having a height to width ratio of about 5:1 to 2:1 and located within said cavity;
    (d) means for moving said element into contact with and past said material;
    (e) means for biasing said element such that the material engaging edge thereof passes through the thickened section a distance further than that through other sections of said material; and
    (f) means for heating said elements and driving its engaging edge quickly through said film plies to sever the seal the same.

11. The apparatus of claim 10 wherein said element has a height to width ratio of about 3:1.

* * * * *